Figure 1:
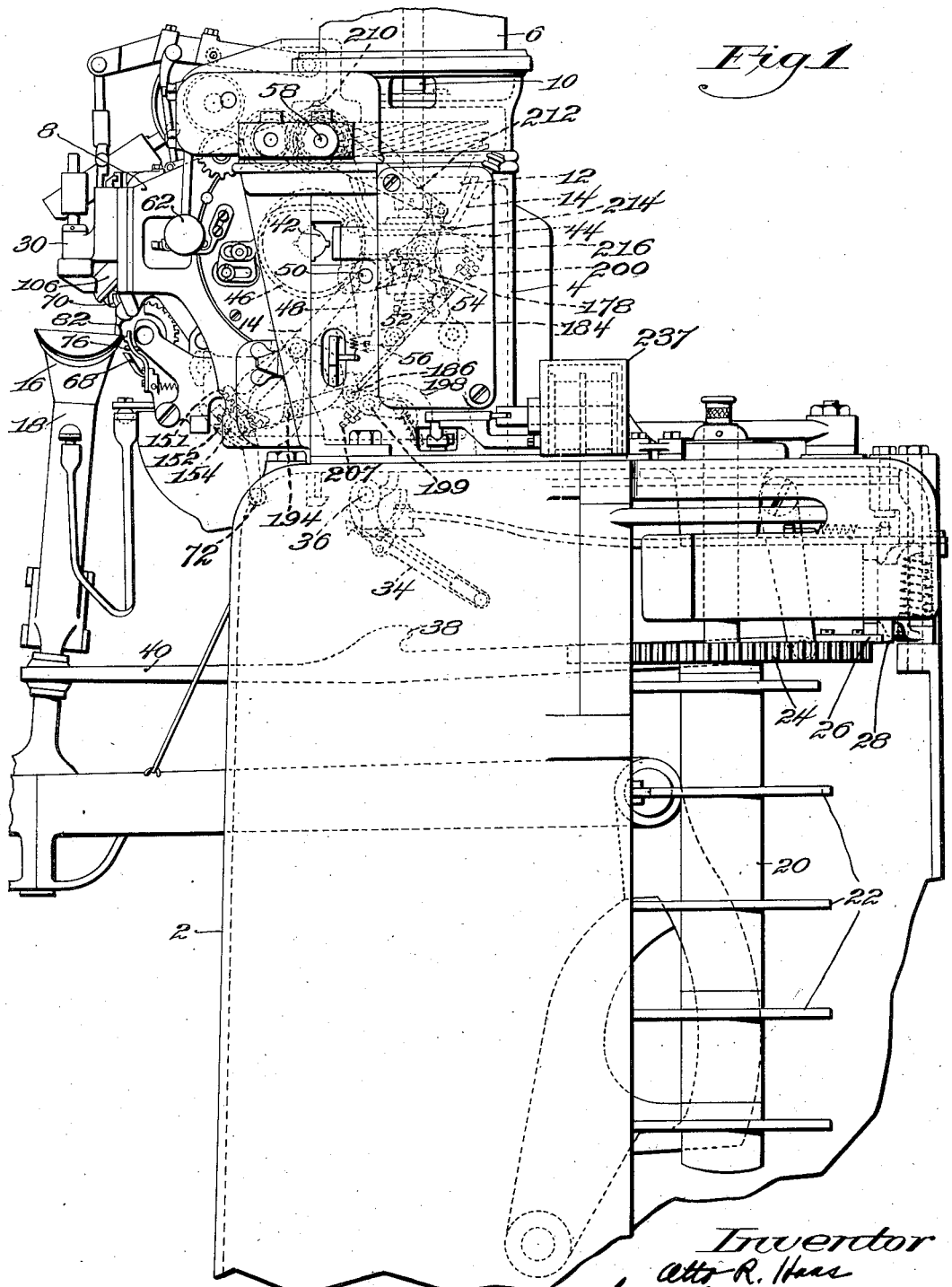

June 30, 1936.  O. R. HAAS  2,045,643

SEWING MACHINE

Filed April 21, 1933  9 Sheets-Sheet 1

Witness
Jas. J. Maloney

Inventor
Otto R. Haas
by Fish Hildreth
Cary & Jenney Attys.

June 30, 1936.  O. R. HAAS  2,045,643

SEWING MACHINE

Filed April 21, 1933   9 Sheets-Sheet 3

Witness
Jas. J. Maloney

Inventor
Otto R. Haas
by Fish Hildreth
Cary & Jenney Attys.

June 30, 1936.   O. R. HAAS   2,045,643
SEWING MACHINE
Filed April 21, 1933   9 Sheets-Sheet 4
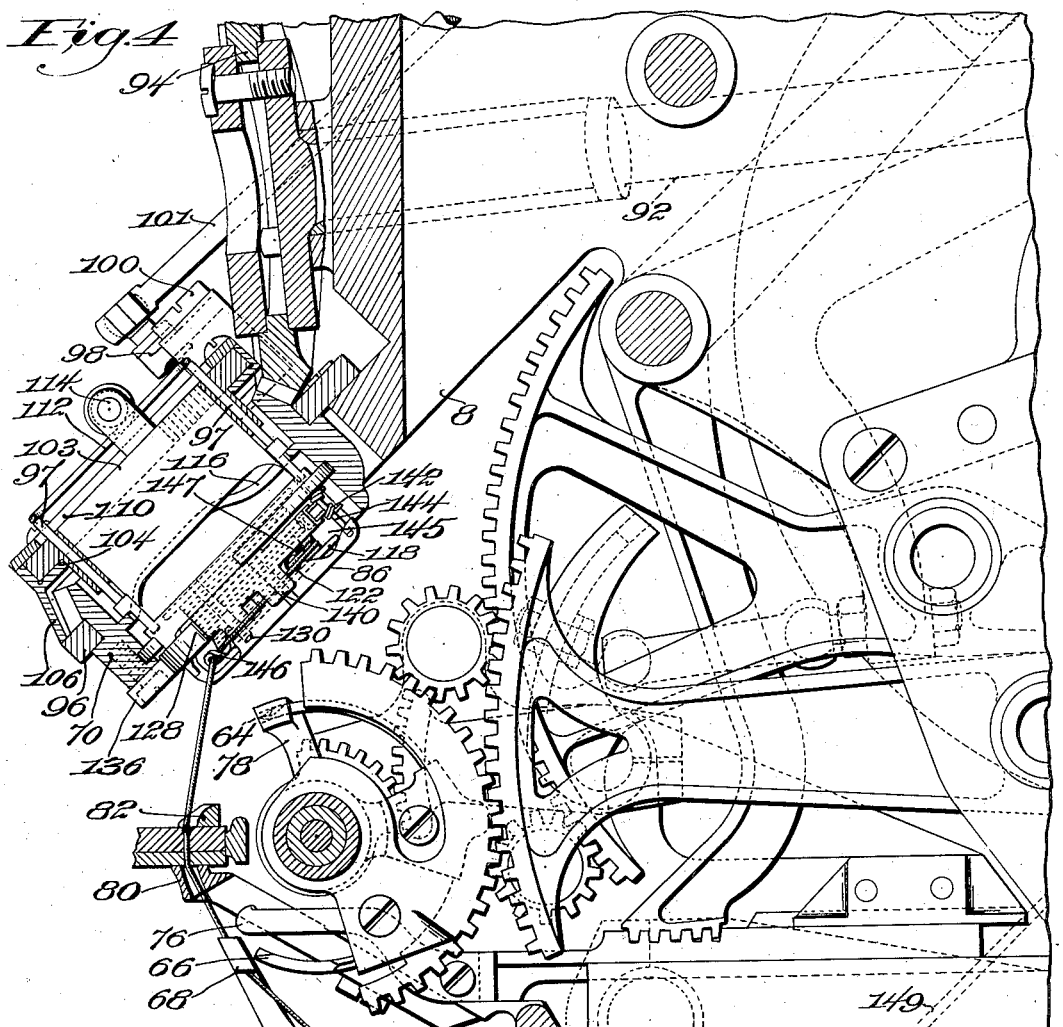
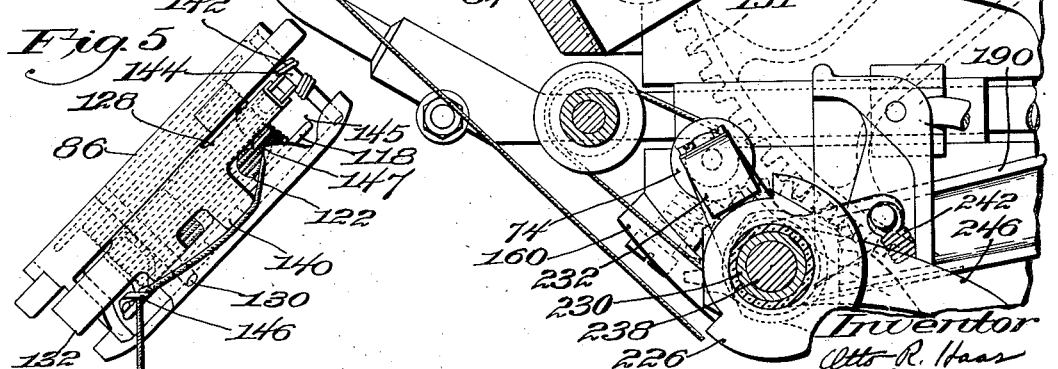

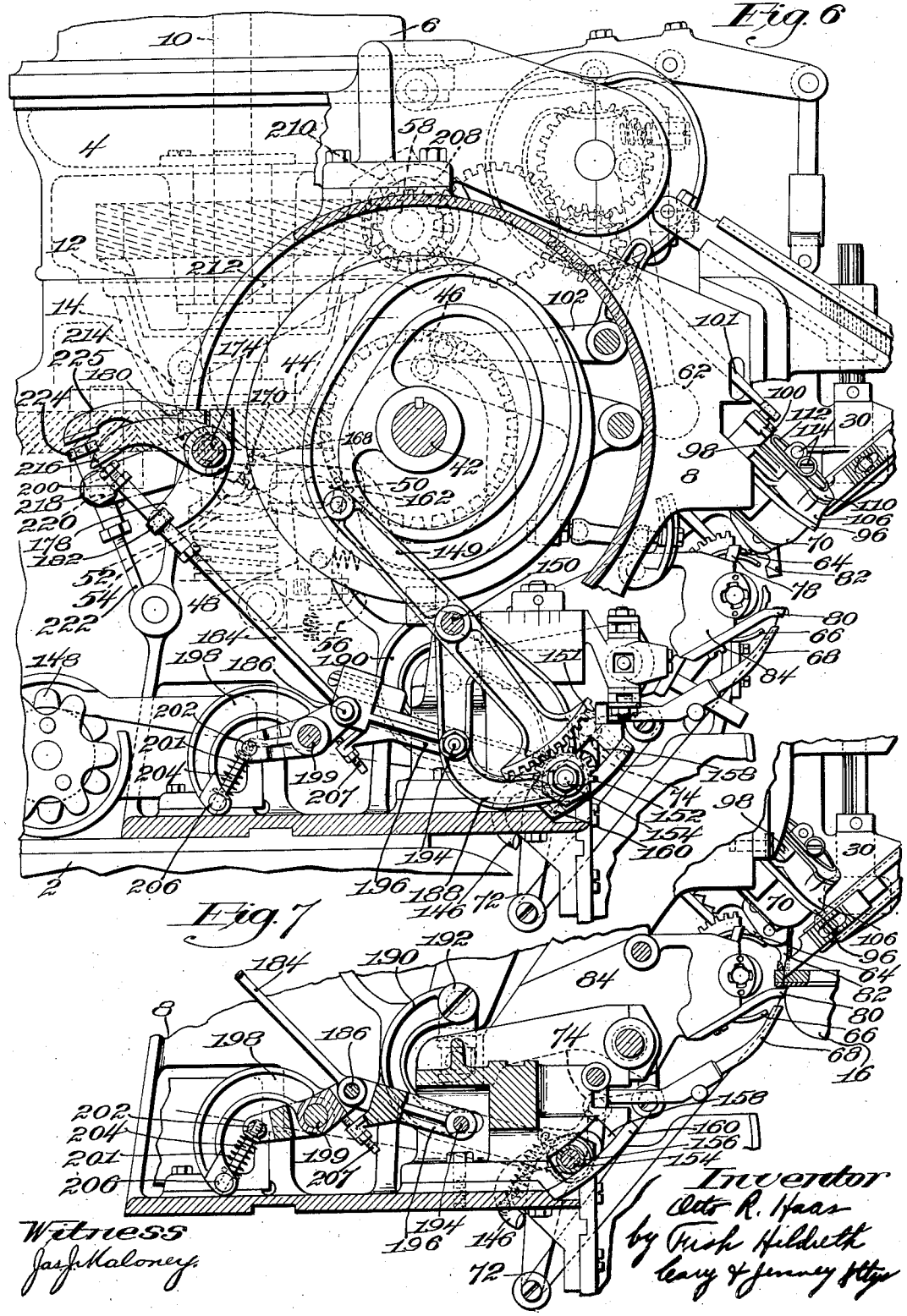

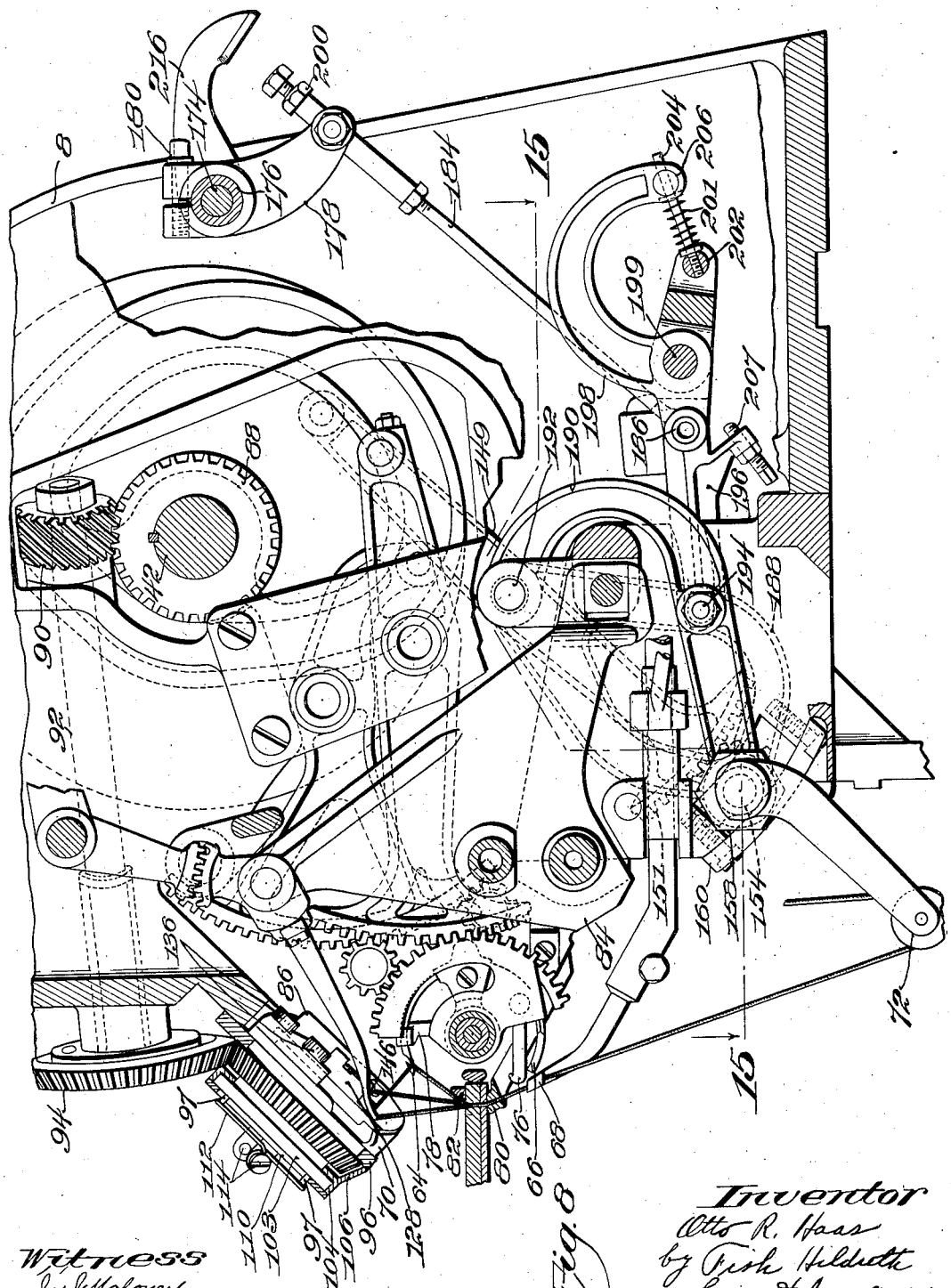

June 30, 1936.    O. R. HAAS    2,045,643
SEWING MACHINE
Filed April 21, 1933    9 Sheets-Sheet 7
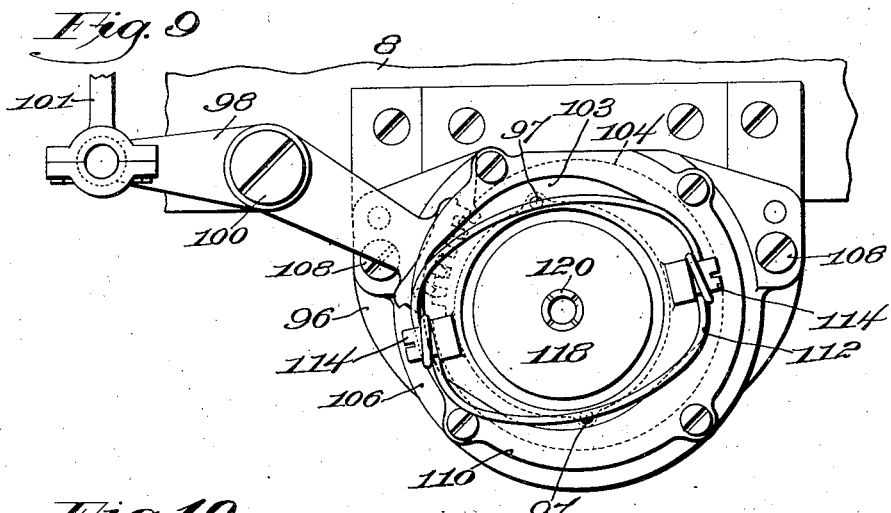
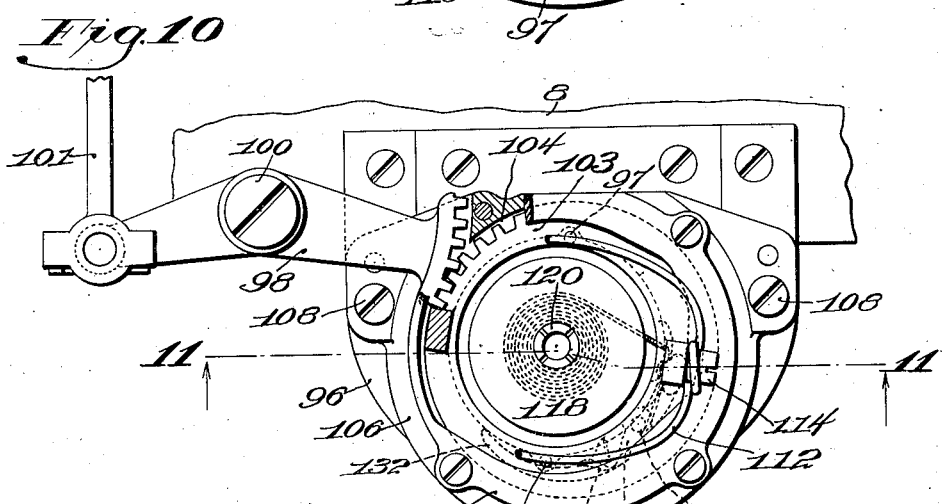
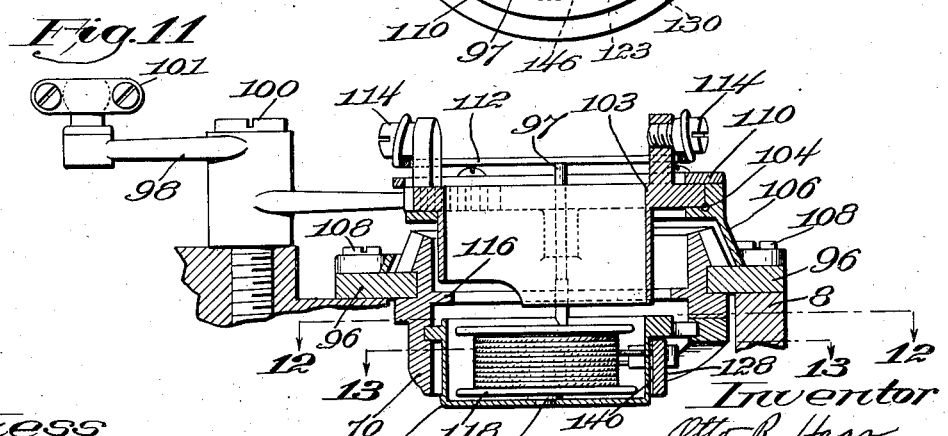
Witness
Jas J Maloney
Inventor
Otto R. Haas
by Fish Hildreth
Cary & Jenney Attys June 30, 1936.    O. R. HAAS    2,045,643
SEWING MACHINE
Filed April 21, 1933    9 Sheets-Sheet 8
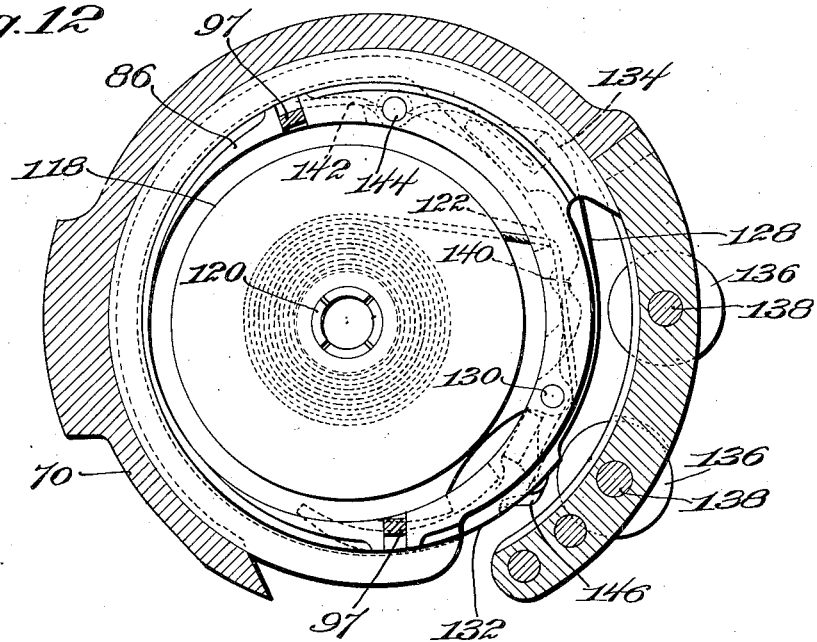
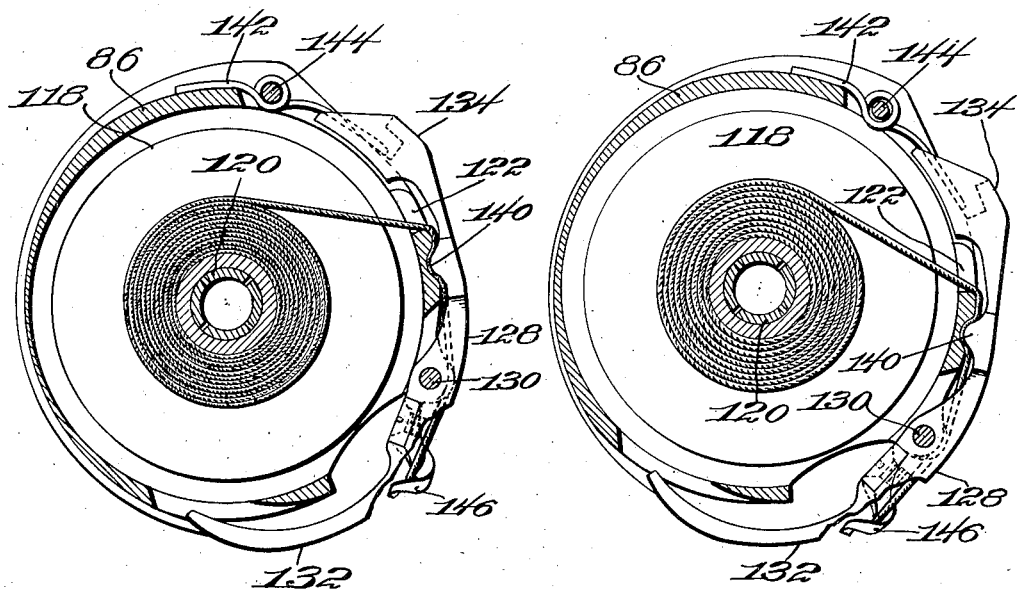
Witness
Jas. F. Maloney
Inventor
Otto R. Haas
by Fish Hildreth
Cary & Jenney Attys.

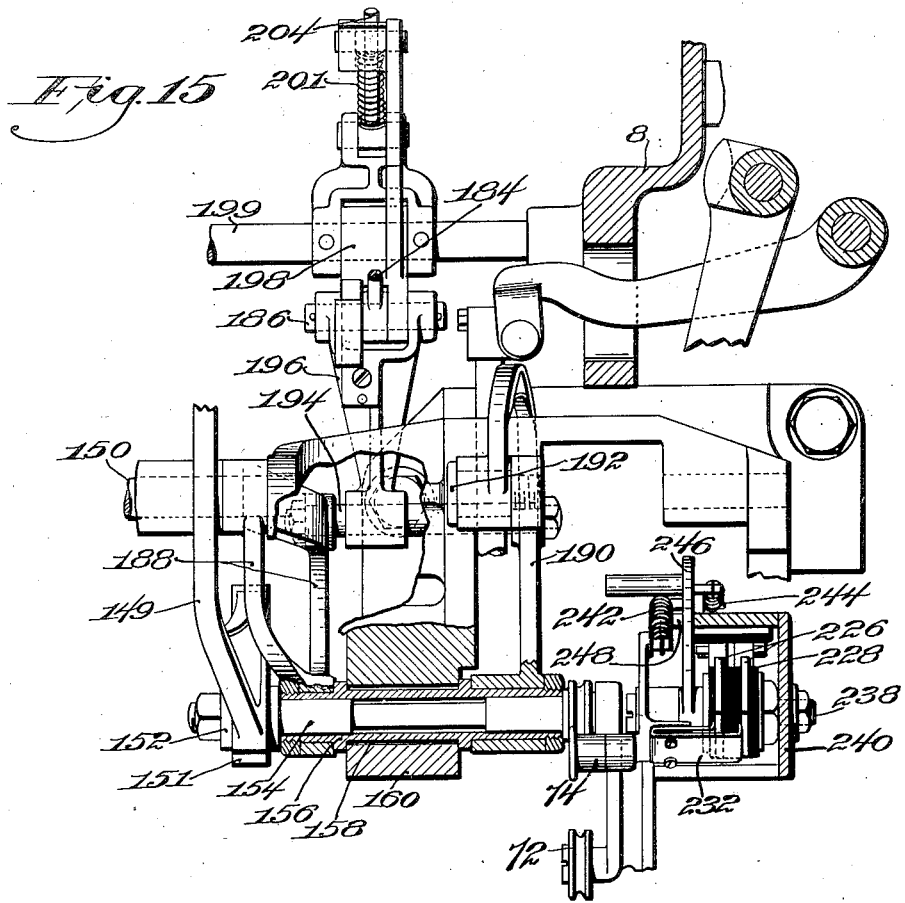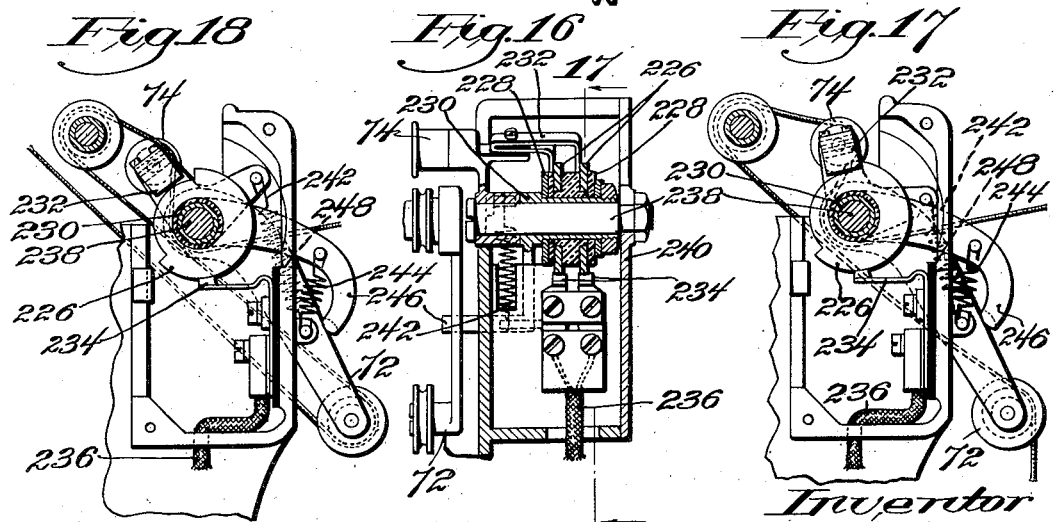

Patented June 30, 1936

2,045,643

UNITED STATES PATENT OFFICE 2,045,643

SEWING MACHINE

Otto R. Haas, North Beverly, Mass., assignor to United Shoe Machinery Corporation, Paterson, N. J., a corporation of New Jersey Application April 21, 1933, Serial No. 667,224

25 Claims. (Cl. 112—38)

The present invention relates to sewing machines, and is herein set forth as embodied in a lockstitch outsole shoe stitcher of the type described in the present inventor's pending application for U. S. Patent Ser. No. 600,016, filed March 19, 1932 in which the shoe and the stitch-forming devices are moved relatively to transfer the point of operation about the shoe and to change the relative positions of the shoe and the stitch-forming devices to present the shoe properly to the stitch-forming devices as the point of operation is transferred about the shoe, and in which the shoe is supported in operating position in the machine and all of its movements are effected and controlled by automatically acting mechanisms.

The object of the invention is generally to improve the construction and mode of operation of the stitch-forming devices of a sewing machine and particularly to provide a lockstitch outsole shoe sewing machine of the type mentioned which is more efficient, reliable and uniform in operation, particularly at high speeds, as compared to prior machines not only where the machine is wholly automatic in character, but also where at least some of the required relative movements of the operating instrumentalities of the machine and the shoe are required to be produced or controlled by the operator.

In the machine described in the application referred to, a pull-off member acts to engage the locking thread between the thread case and the work to measure off and hold a predetermined supply of thread during the formation of each stitch. The measured supply is then released before setting the stitch so that the point of interengagement between the locking and the needle threads may be drawn into the work. With the use of this or any other type of separately movable pull-off device there is a liability of entanglement with the threads or of other improper operations due to the close proximity of the other thread handling parts, and due to the fact that the time is limited in which the measured supply of locking thread may be held by the pull-off from interfering with the other stitch-forming devices.

A feature of the present invention, therefore, contemplates the provision in a hook needle lockstitch shoe sewing machine having a loop taker or shuttle and a locking thread case about which the loop taker rotates, of means for causing a measured length of locking thread to be withdrawn without the addition to the machine of a special thread pulling member, by imparting movements to the thread case separate from the looping movement of the loop taker at certain times in each stitching cycle. In the present embodiment of this feature of the invention, the thread case is mounted concentrically with rotary axis of the loop taker and the thread, being unsupported between a passage in the thread case and the work, is increased in length by oscillating the thread case relatively to the loop taker. The thread case is rotated in one direction to measure the thread, held in position, and thereafter restored to its original position so as to yield up thread only as each stitch is being drawn into the work, thus preventing slack thread between the thread case and the work. In the form shown, the means for rotating the thread case comprises a mounting member slidably supporting a pair of pins which act alternately to engage slots in the thread case to prevent displacement of the thread case, and the mounting for the pins is rotatable on the machine for imparting the measuring movement to the thread case.

In connection with the thread measuring means, according to the present invention, a novel and improved thread lock is provided on the thread case acting in timed relation to the thread measuring operation to grip and release the thread so that each stitch may be set uniformally against the lock. As illustrated, this thread lock is operated positively by the loop taker as it rotates about the thread case, to grip the thread as the thread case is moved to yield up the measured supply of thread and as each stitch is being set.

In the machine of the inventor's prior application, a stopping mechanism is provided to stop the machine with the needle and awl disengaged from the work, and with the take-up moved from a maximum thread retracting position to a position where a part of the needle thread is yielded up as the machine comes to rest. In that machine the slack thread yielded up by the take-up during the final movements of the machine is likely to be withdrawn from the work support as the work is being removed, so that upon starting the machine on a new shoe, the end of the needle thread extends from the first stitch so far as to require hand trimming with resulting waste of thread.

According to another feature of the present invention forming the subject-matter of a divisional application filed September 28, 1935, Serial No. 42,665, means is provided in a sewing machine arranged to operate in the manner just described, for preventing the thread from being withdrawn after the machine is brought to rest. In the present form of the machine, an additional movement is imparted to the take-up by connections to the stopping mechanism, so that substantially no slack thread is provided when the stopping mechanism has operated, and a complete seam will be formed which requires no hand trimming operation. This arrangement is particularly useful when employed with lockstitch machines of the automatic type in which the shoe is supported on a jack, and in which both the threads are automatically severed close to the surface of the work, and the shoe moved out of engagement with the stitching devices at the end of the seam. Accordingly, the connections for actuating the take-up to prevent slack thread, as herein described, are caused to operate in proper timed relation with the stitch forming devices and with other mechanisms before the threads are severed and before the shoe is disengaged from the stitch forming devices.

These and other features of the invention including certain novel and improved constructions and arrangements of parts are herein described in the following detailed specification, and are more particularly pointed out in the appended claims.

Figure 2:
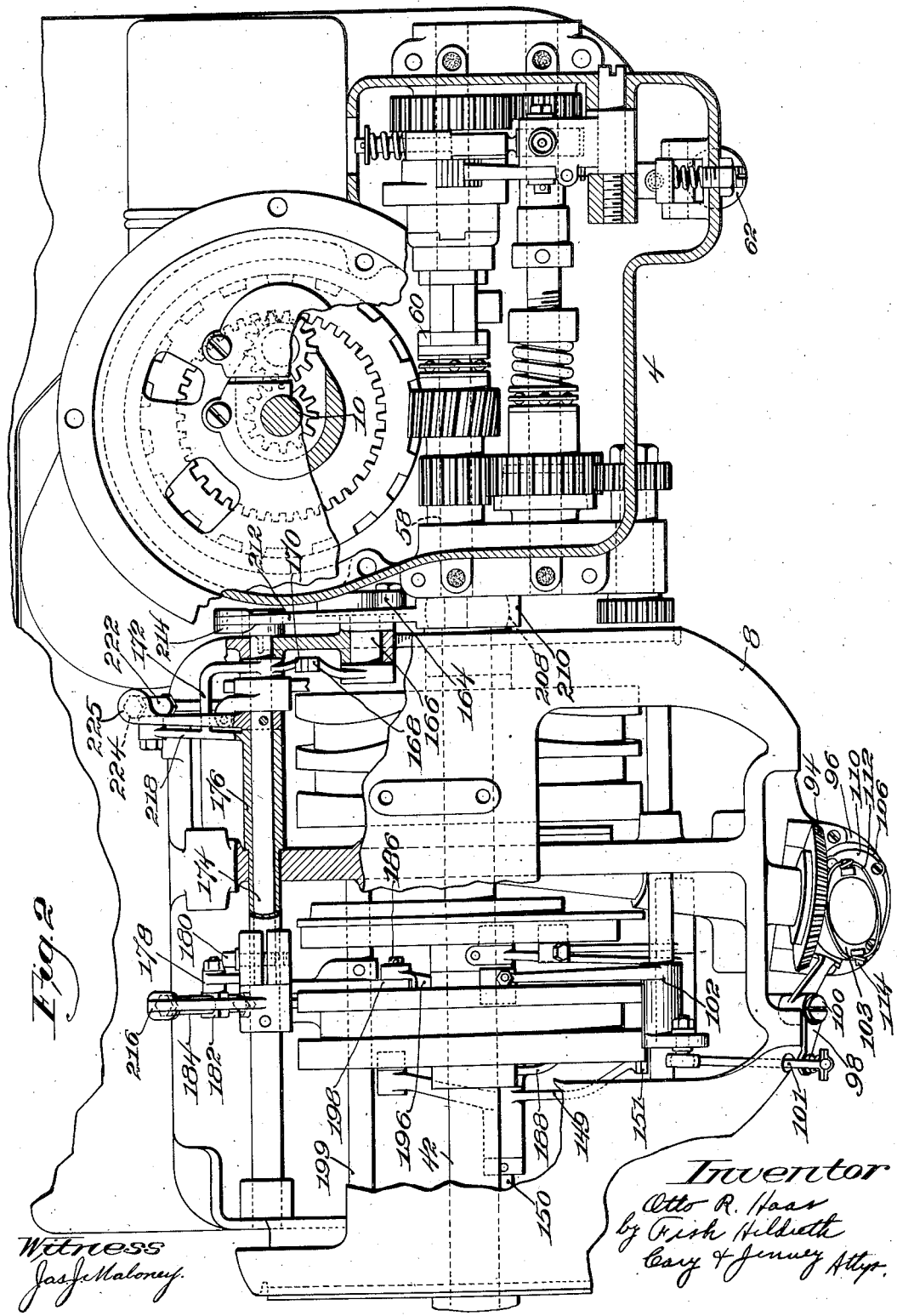
Figure 3:
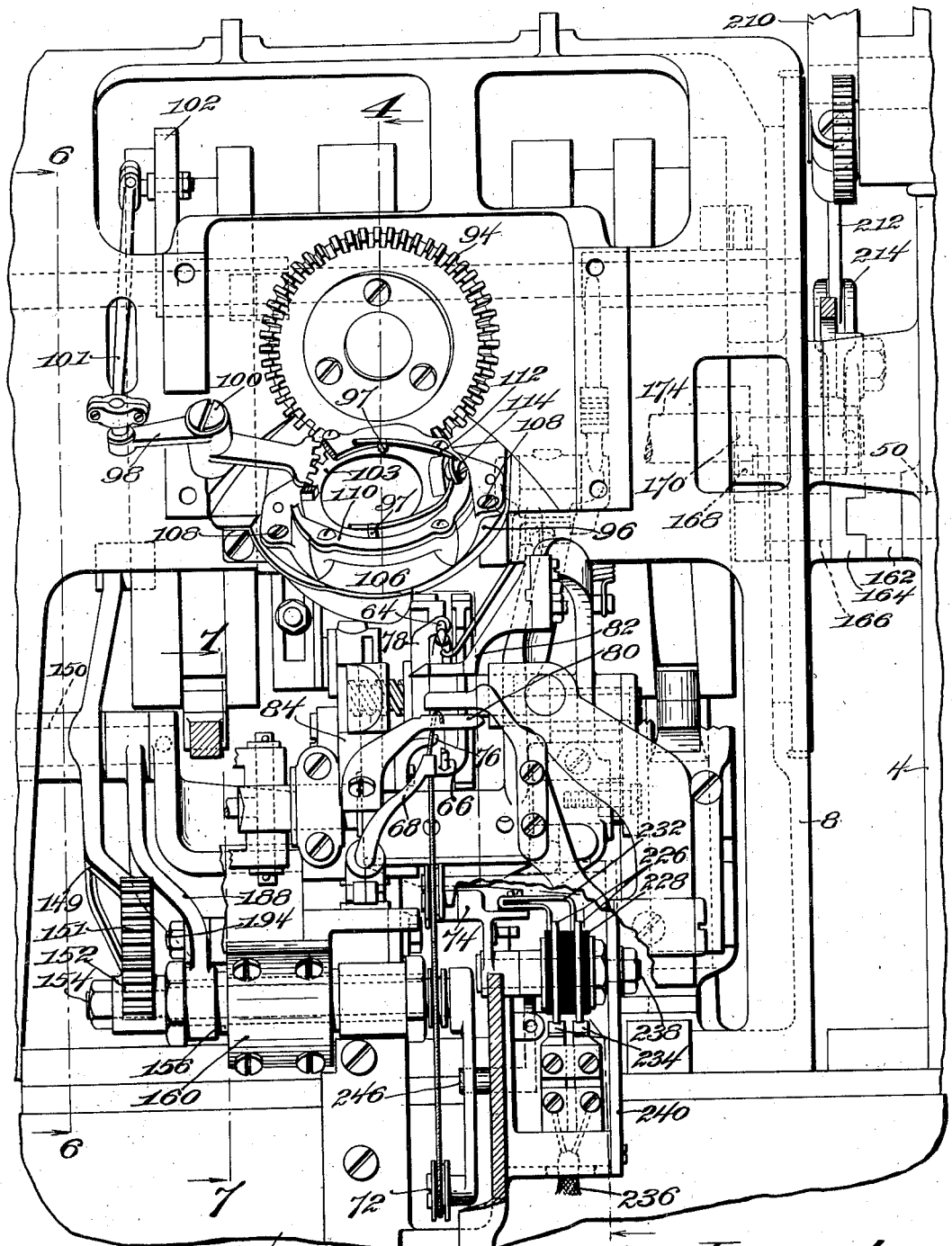

In the drawings, Fig. 1 is a view in side elevation of a machine embodying the features of the present invention, the lower portion of the main base and the upper part of the frame having been broken away; Fig. 2 is a plan view partially in section on an enlarged scale showing a part of the driving mechanism for the machine; Fig. 3 is a view in front elevation of the sewing mechanism of the machine with certain parts broken away or removed; Fig. 4 is a sectional view on a still further enlarged scale, taken along the line 4—4 of Fig. 3; Fig. 5 is a detail view on a scale somewhat greater than used in Fig. 4, of the bobbin case for the machine; Fig. 6 is a sectional view of the sewing mechanism taken along the line 6—6 of Fig. 3; Fig. 7 is a sectional view taken along the line 7—7 of Fig. 3, of a portion of the mechanism shown in Fig. 6, indicating the thread cutter in cutting position; Fig. 8 is a view in side elevation on a slightly enlarged scale and partly in section of the mechanism shown in Fig. 6, looking from the right side of the machine; Fig. 9 is a detail view on an enlarged scale of the arrangement of the bobbin thread case and its mounting; Fig. 10 is a view similar to Fig. 9 and partly in section; Fig. 11 is a sectional view of the parts shown in Fig. 10 taken along the line 11—11 of that figure; Fig. 12 is a view on a still further enlarged scale and in section along the line 12—12 of Fig. 11; Figs. 13 and 14 are similar sectional views along the line 13—13 of Fig. 11, indicating the angular relation of the thread case in its extreme operating positions; Fig. 15 is a plan view partly in section along the line 15—15 of Fig. 8 of a part of the take-up actuating mechanism; Fig. 16 is a sectional view in elevation of some of the take-up parts shown in Fig. 15; Fig. 17 is a side view partly in section taken along the line 17—17 of Fig. 16, showing more particularly the relations of the parts upon the occurrence of slack or broken thread; and Fig. 18 is a view similar to Fig. 16, showing the position of the parts during sewing.

Referring to the drawings, the frame of the machine comprises a main base 2, a frame 4 containing the power driving mechanism and supporting a motor, the lower portion of which is indicated at 6, and a frame 8 supporting the sewing mechanism. The motor 6 drives the machine through a vertical shaft 10 arranged to rotate continuously while the motor is running. The mechanism in the base 2 and the sewing mechanism are driven by suitable gearing mounted within the frames from the continuously rotating shaft 10 through a clutch comprising a driving member 12 and a driven member 14.

The sewing mechanism of the machine, as illustrated, is arranged to stitch the outsole to a lasted shoe, the shoe being operated upon being indicated at 16 in Fig. 1 of the drawings. The shoe 16, while being sewed, is supported upon a jack 18 mounted within the main base 2. The connections between the jack 18 and the base 2 are such that the shoe may be tipped and turned and fed laterally with respect to the sewing mechanism to present the shoe properly thereto while mounted on the jack. These movements are controlled from a pattern cam shaft 20 having a series of cams 22. The cam shaft 20 carries a driving gear 24 which is rotated through nearly a complete revolution during the operation on a single shoe. At the end of the sewing operation, a block 26 secured to the gear 24 engages a pawl 28 movably mounted within the main base 2. Movement of the pawl 28 by the block 26 sets in motion certain auxiliary mechanisms driven from the motor shaft 10 to complete the formation of a seam, sever the thread, release the shoe from the sewing devices, and return the jack to its original position.

The thread is severed by a thread cutter indicated at 30, of the same construction and mode of operation as that described in the present inventor's co-pending application for Shoe sewing machine, Serial No. 651,803, filed January 14, 1933, in which a knife is projected against and enters beneath the surface of the shoe sole while the shoe is held in operative position, so as to sever the threads with the ends remaining in engagement with the work, as shown in Fig. 7. The shoe is then released, and the jack is swung forwardly out of operating position from the machine by a lever 34 carried by a shaft 36 in the base 2, which lever engages a projection 38 formed on a bar 40 connected with the jack. Thereafter, the cam shaft is rotated through the remainder of a complete revolution, the jack returned to starting positon and the shoe released from the jack.

The sewing mechanism of the machine is operated from a sewing cam shaft 42 rotated from the driven clutch member 14 through a pair of helical gears 44 and 46 attached to the clutch member and to the cam shaft, respectively. When it is desired to stop the machine, the driven clutch member 14 is disengaged from the driving clutch member 12 by a driving and stopping mechanism comprising in part a bell-crank 48 secured to a shaft 50 in the frame 4, and rocked in a clockwise direction, as viewed in Fig. 1 through the engagement of a bolt 52 on one arm of the bell-crank with a cam slot 54 in a sleeve attached to the driven clutch member 14. The return movement of the shaft 50 and the bell-crank 48 in a counter-clockwise direction is prevented by a latch 56 which engages the vertical arm of the bell-crank and causes the clutch to be disengaged by the action of the cam slot 54 on the bolt 52 in the horizontal arm of the bell-crank 48.

After the operations on the shoe are completed and the machine is brought to rest, a new shoe may be substituted for the one on which the operation is complete, and the machine again started by engaging the driven clutch member 14 with the driving clutch member 12. To cause the movement of the driven clutch member against the driving clutch member, a power driven shaft 58 having a crank portion 60 connected by a pitman and other suitable means to release the bell-crank 48 from the latch 56 is caused to rotate through one complete revolution by the manipulation of a starting handle 62.

The stitch forming and work feeding devices of the machine include a curved hook needle 64, a curved awl 66, a looper 68, a shuttle or loop taker 70, a main take-up 72, an auxiliary take-up 74, a thread finger 76, a needle guide 78, a work support 80, a presser foot 82, and a feed slide 84 on which certain of the stitch forming devices are carried. The stitch forming and work feeding devices operate with a continuous feeding movement to form a lockstitch seam, and at the end of the operation, the stopping mechanism including the bolt 52 on the bell-crank 48 and the cam slot 54 in the driven clutch member 14 are arranged to bring the sewing mechanism to rest at a definite point with the needle and awl disengaged from the work. To permit the stitch-forming devices to operate at high speeds, the timing is so arranged that the awl enters the work after the needle has withdrawn with its loop of thread and while the needle thread is being interlocked with the locking thread by the shuttle. With this system of timing, it is necessary to cause the looper to misloop the needle in bringing the machine to rest after the last needle loop has been drawn down into the work in order that the machine may stop with the needle free of thread and at a point in the cycle of operations in which, when the machine is again started, the awl will enter the work before the needle.

The take-up operates to draw the needle loop with the locking thread towards the work, and to set the stitch during the final thread retracting movement of the take-up. The position of the lock between the threads in the work is determined by the amount of thread withdrawn from a locking thread bobbin case 86 having a radial flange extending for support into a correspondingly shaped groove within the shuttle. The bearing thus formed for the thread case is concentric with the axis of shuttle rotation, so that when the thread case 86 is held from turning with the shuttle, no movement of the thread case will take place. The shuttle is rotated continuously from the cam shaft at a rate of speed greater than that of the cam shaft. The connections between the cam shaft and the shuttle, as shown in Fig. 8, comprise a helical gear 88 fixed to the cam shaft 42, a corresponding gear 90 meshing with gear 88, a forwardly extending shaft 92 at the end of which the gear 90 is fixed, and a bevel gear 94 on the forward end of the shaft 92 meshing with bevel gear teeth on the shuttle 70.

The shuttle 70 is mounted for rotation on a circular guideway 96 (see Figs. 9 to 11) secured to the frame 8 of the machine, and the bobbin case 86 is prevented from rotating with the shuttle by the engagement of a pair of reciprocating pins 97 alternately engaging notches in the upper surface of the thread case. All of the mechanisms thus briefly referred to are substantially the same, except as hereinafter described, as in the machine of the inventor's applications above identified.

In the embodiment of the present invention, a predetermined supply of thread is withdrawn from the thread case 86 by imparting a small angular rotation to the thread case at the proper time in each stitch forming cycle of the machine. This movement is imparted by a means separate from the shuttle and the other stitch forming devices, so that the thread may be held substantially taut throughout the stitching cycle and may be given up only as used in setting the stitch.

The means for imparting the thread measuring movement to the thread case 86, is illustrated in Figs. 6 and 9 to 11, and comprises a lever 98 fulcrumed on a stud 100 threaded into the frame 8 of the machine. One arm of the lever is connected by a link 101 to a cam actuated lever 102 and the other arm of the lever 98 is in the form of a gear segment meshing with teeth on a hollow circular flanged carrier 103 supported for rotation in a groove 104 formed in a support 106 secured by screws 108 to the guideway 96 for the shuttle. The support for carrier 103 is so mounted on the guideway 96 for the shuttle that the groove 104 is concentric with the center about which the shuttle rotates, and the carrier is retained in place by a circular plate 110 secured to the support 106. The reciprocating pins 97 which engage the thread case 86 are slidably supported within the carrier 103 and are forced towards the thread case 86 by a circular spring 112 surrounding the hollow of the carrier, being retained on the carrier by screws 114 threaded into lugs formed on the carrier. The pins 97 are raised one at a time as the shuttle is rotated by a cam ring 116 extending within the shuttle which is engaged by shoulders formed on the pins. The pins are operated in the usual way to hold the thread case from rotation, and to permit the needle loop to pass first one pin and then the other as it is carried around the thread case.

The locking thread supply is contained on a bobbin 118 removably mounted on a slotted pin 120 secured within the thread case, slots being formed in the pin to impart sufficient resiliency to the pin, so that a substantially uniform frictional effect will be produced upon rotating the bobbin to act as a tension on the locking thread. The thread extends from the bobbin through a thread passage 122 (see Figs. 5 and 13) in the side wall of the thread case and downwardly to the work. When the thread case 86 is rotated in a counter-clockwise direction, as viewed in Fig. 10, the thread, being retained at its lower end in the work, will be drawn through the passage 122 in the thread case from the bobbin 118. The thread case is then held in the position indicated in Fig. 13, the thread passage 122 having been moved upwardly away from the work. The thread case is returned to its original angular position indicated in Fig. 14 to release the thread previously measured from the bobbin. These measuring and releasing movements may be timed to take place at any desirable time during each cycle of operation of the machine without interfering in any way with the operation of the other stitch forming devices, inasmuch as the thread extends directly between the thread case and the work and is not supported at any point throughout its length by the other stitch forming devices, the resistance of the last formed stitch in the work being sufficient to cause the thread to be drawn from the thread case.

In the machine herein illustrated, the thread is measured from the thread case 86 directly after the previous stitch has been set and while the take-up remains substantially at its lowermost thread retracting position. At this time the previous stitch is firmly held in place by the take-up, so that when the thread case is rotated, there will be no possibility of displacing said stitch in the work, and the required amount of thread will be measured uniformly from the thread case. As an added precaution the needle is caused to penetrate the work during the locking thread measuring operation so that there will be a tendency to squeeze the work against the previously set stitch. After the thread has been measured, the thread case remains stationary, thus holding the thread substantially taut between the thread case and the work until the succeeding stitch is being drawn into the work. The thread case is rotated in the reverse direction to yield up thread to the work while the needle loop of the succeeding stitch is being drawn from the thread case into the work and until the time the stitch is being set. By retaining control of the locking thread in this way, the stitches are not only formed more uniformly, but there is less likelihood of entanglement of the locking thread with other operating parts when the machine is running at high speeds.

In removing a shoe from a sewing machine after the sewing operation is completed according to the usual practice, the shoe is withdrawn a short distance from the work before the threads are severed so as to provide extra thread of more than sufficient length to form the first stitch of a new seam. This cannot be done with the type of thread cutter employed in the present machine since the work must be retained on the work support while the thread cutter operates. However, a uniform length of locking thread is automatically measured for the initial stitch in the present machine by the locking thread measuring arrangement herein described. When the machine is brought to rest, the locking thread measured after the final stitch setting movement of the take-up is just sufficient to complete the initial stitch when the machine is started so that no additional thread drawing means is necessary. Each seam may, therefore, be started with a completely formed stitch without having a length of locking thread depending from the stitch which will necessitate trimming and waste.

In order to insure that a further supply of thread will not be withdrawn from the thread case during sewing when the stitch is set, a thread lock is provided in the machine illustrated against which the stitch setting strain acts. The thread lock comprises a lever 128 fulcrumed on a pin 130 carried by the thread case 86. The two arms of the thread lock lever 128 are respectively provided with cam surfaces 132 and 134 positioned for operation by a pair of rollers 136 rotatably mounted upon pins 138 in one side of the shuttle 70. The thread lock lever 128 is also provided with a projection 140 cooperating with a notch in the side of the thread case through which the thread from the bobbin passes, which projection is held in firm engagement with the thread by a spring 142 surrounding a pin 144 mounted in the thread case. The spring acts on the lever 128 at one end in a notch formed in the arm of the lever having the thread engaging projection 140 and at the other end on the side of the thread case to force the lever toward locking position. As the rolls 136 are rotated with the shuttle in a counterclockwise direction, the rolls first engage the cam portion 132 on the lever 128, and cause the lever to be rocked about its pivot 130 to release the thread from the lock, as shown in Fig. 12. As the shuttle continues to rotate, the rolls 136 are disengaged from the cam portion 132 and engage the cam portion 134 to positively actuate the thread lock lever into locking position. While the rolls 136 are in engagement with the cam portion 132 of the lock lever, and the lock is released from the thread, the thread case is rocked to measure the thread, thus permitting the thread to be drawn freely through the passage 122 in the side of the thread case. When the take-up has drawn the needle loop from the shuttle and the needle loop engages the locking thread, a further movement of the thread is prevented by the thread lock, and until the stitch is set the thread is held by the thread lock. The release of the lock from the thread takes place immediately after the stitch has been set, and in order to prevent any additional movement of the locking thread due to the strain and the resiliency of the needle thread, the take-up is moved slightly to release a part of the tension on the needle thread before the thread lock for the locking thread is opened.

To permit easy threading of the bobbin case in the illustrated machine, the upper side portion of the case is cut away at 145, as indicated more clearly in Figs. 4 and 5, and the passage 122 for the thread is arranged to communicate with the cut-away portion 145 by a narrow slot 147 connecting the two. The lever 128 is provided with a cork screw guide 146 within which the thread may be positioned. The passage 122 and the guide 146 are arranged in alinement with the projection 140 of the thread lock lever so that when the thread is pulled taut between them, it will be drawn beneath the projection which thereafter acts to grip the thread. With this arrangement, the thread may be engaged in the passage 122, and the guide 146 as shown in Fig. 5, without requiring particular positioning of the thread relative to the thread lock projection 140, and during the first operation of the lever 128 by the rolls 136 towards thread releasing position, the thread will move beneath the projection 140 as shown in Fig. 4.

At the end of the sewing operation after the thread cutter 30 has acted and the shoe is being moved away from the work support, the frictional engagement of the ends of the threads in the work tends to cause the threads to be drawn with the shoe. The action of the needle thread tension, indicated at 148, and of the thread lock on the thread case are sufficient to prevent drawing an unlimited amount of thread from the respective thread supplies. In the case of the needle thread, however, with the use of the present timing, and the present stopping mechanism, the main take-up would ordinarily be actuated during the final movements of the machine to give up a certain portion of the thread. Due to the failure of the looper to loop the needle on the last cycle of the machine, a supply corresponding to the thread releasing movement of the take-up might be withdrawn with the shoe after severing the threads. As the machine is started on a new shoe, the amount of thread attached to the first stitch might be so long as to require trimming after the shoe is removed from the machine.

In order to prevent a substantial length of needle thread from being withdrawn from the work support at the end of a seam by frictional engagement with the shoe sole, an extra movement, as hereinafter more fully described, is imparted to the take-up during the final movements of the machine so as to bring it into a position substantially the same as its position during sewing in which the maximum amount of thread is retracted. This position may be suitably regulated to cause the exact amount of thread required for the initial stitch in a new seam to be retained on the work support after the shoe is removed.

The means for actuating the take-up 72 comprises a cam actuated lever 149 fulcrumed on a shaft 150 provided with a gear segment 151 on one arm cooperating with a segment 152 fixed to a shaft 154 on which the take-up is secured. The shaft 154 is rotatably mounted in a sleeve 156 (see Fig. 15) arranged to slide along an arcuate slot 158 in the frame of the machine. The sleeve 156 is retained within the slot by a curved cover plate 160 secured at its ends to the portion of the frame in which the slot is formed. The surfaces of the slot are arranged concentrically with the shaft 150 about which the segment 151 is oscillated, so that movement of the sleeve 156 supporting the shaft 154 will not cause the segment 152 to be disengaged from the segment 151. During the sewing operation of the machine the sleeve 156 is retained at the upper end of the slot 158 and the take-up 72 is oscillated by the shaft 154 in the usual manner. At the end of the sewing operation, a set of connections actuated from the stopping mechanism is operated to move the sleeve 156 towards the lower end of the slot 158 causing the segment 152 to oscillate the take-up 72 to a position substantially corresponding to the extreme thread retracting position of the take-up during sewing.

The connections to the stopping mechanism for causing the take-up to be retained in its maximum thread retracting position, as the machine is stopped, comprises the shaft 50 of the stopping mechanism a block 162 (see Figs. 2, 3, 6 and 15) mounted on the end of the shaft, a block 164 mounted on a shaft 166 and coupled to the block 162 by a tongue and groove connection, a gear segment 168 (see Fig. 2) fixed to the other end of the shaft 166 and a segment 170 on one arm of a U-shaped lever 172 fulcrumed loosely on a horizontal shaft 174 at the back of the machine. The U-shaped lever 172 is connected with a sleeve 176 surrounding the shaft 174 and carrying an arm 178 secured thereto by means of a clamp bolt 180. The arm 178 carries a pivot block 182 slidingly arranged on the upper end of a rod 184 pivotally connected at its lower end to a pivot 186 of a toggle connected for operating the sleeve 156.

The sleeve 156 is secured at its ends to a pair of links 188 and 190 (see Fig. 15), the link 188 being loosely mounted on the shaft 150 for the take-up actuating lever 149 and the link 190 being mounted upon a threaded stud 192 supported by a lug on the frame of the machine. The links 188 and 190 are connected together between their ends by a shaft 194 to cause them to move together, and their position is controlled by the movement of the toggle comprising a link 196 and a lever 198. The lever 198 is mounted on a shaft 199 in the frame and is pivotally connected with the link 196 by the pivot 186 which passes through the lower end of the link 184. When the rod 184 is moved upwardly by the engagement of the block 182 with a nut 200 on the rod 184 through the action of the connection to shaft 50 of the stopping mechanism in bringing the machine to rest, the alinement of the toggle links is broken (see Fig. 7) causing the take-up to move to its lowermost position. The connections are maintained in this position by a compression spring 201 acting between one arm of the lever 198 and a pivot 202 rotatably mounted in a portion of the frame to provide a snap action to the toggle movements. The spring 201 surrounds a rod 204 secured at one end to the pivot 202 and slidingly arranged in a transverse opening through a pivot 206 mounted in a downwardly curved arm of the lever 198 against which the spring 201 bears. The toggle is maintained in a definite broken position by contact of one arm of the toggle lever 198 with an adjustable set screw 207 threaded into a lug extending from the link 196. The final stopping position of the take-up and therefore the amount of thread to be employed in forming the first stitch on a new seam may be regulated by adjusting the set screw 207.

As the machine is being brought to rest, the threads are held against substantial slackness by the operation of the take-up, as hereinbefore described and also by the operation of the locking thread case. The stopping mechanism brings the machine to rest after rotation of the thread case to measure thread, but before the thread case is returned to its original position to yield up the measured thread. Thus, the machine comes to rest with a measured supply of thread retained by the thread case. The lock on the thread case holds the thread securely so that effective operation of the thread cutter is insured even though the cutting edge is somewhat worn. When the machine is again started in operation, the thread case is returned to its original position to yield up the thread in sufficient time for the needle loop to engage the end and draw it into the work in forming the initial stitch.

When the machine is started, the starting handle 62 being actuated to cause the crank shaft 58 to rotate, the sleeve 156 for supporting the take-up shaft 154 is moved to the upper end of the slot 158. The connections for so moving the sleeve 156 comprise an eccentric 208 on one end of the shaft 58, an eccentric strap 210 surrounding the eccentric, a link 212 connected between the eccentric strap and an arm 214 fixed to one end of the shaft 174 on which the lever 172 is mounted. Rotation of the crank shaft 58 in starting the machine causes the shaft 174 to be rocked first in one direction and then the other and an arm 216 secured to the shaft is caused to engage the upper end of the rod 184, forcing the rod downwardly to move the toggle comprising the link 196 and the lever 198 into alinement. This movement causes the sleeve 156 to be shifted to the upper end of the slot 158 and to be held in this position by the snap action of the spring 201 while the machine is in operation.

In the machine described, some of the connections which operate simultaneously to move the sleeve 156 carrying the take-up shaft are also employed to cause the looper to misloop the needle after the last formed stitch. These connections operate in the same way as described in the machine of the inventor's applications, above identified, and are arranged to be operated from an arm 218 extending from the U-shaped portion of the lever 172. The arm 218 carries a perforated block 220 in which the upper end of a link 222 slides and movement is imparted to the link from the block by the engagement of the block with an adjusting nut 224 carried by the upper end of the link. Upward movement of the link 222 causes the path of movement of the looper to be shifted away from the path of the needle. The looper actuating connections are returned to normal sewing positions by downward movement of the link 222. The link 222 is moved downwardly by an arm 225 fixed to the shaft 174 between the arms of the U-shaped lever 172 and is rocked simultaneously with the movement of the arm 216 which returns the take-up to normal operating position.

To indicate by stopping the machine or otherwise, breakage of the needle thread as in the machine of the co-pending applications, an electrical switch is arranged to be operated jointly by the main and auxiliary take-ups. Due to the movements of the pivot shaft 154 of the main take-up on the machine frame, the switch and auxiliary take-ups are separately mounted and additional connections are provided for operating the switch from the main take-up.

The thread break indicating switch shown in Figs. 15 to 18, comprises a pair of segmental contacts 226 supported between insulating washers 228 carried by a sleeve 230 and a movable contact 232 mounted on the auxiliary take-up 74. The movable flat spring contact 232 when brought into engagement with the disks 226 causes the current to flow therebetween and the disks 226 are connected by a pair of sliding contacts 234 with a conductor 236 leading to an electro-magnetic device 237 for actuating the stopping mechanism of the machine. The sleeve 230 carrying the contact disks 226 is rotatably mounted upon a shaft 238 mounted at one end in a slot in a plate 240 secured to the machine and the auxiliary take-up is rotatably mounted at the other end of the shaft. The auxiliary take-up exerts a yielding tension on the thread and a spring 242 is connected from an arm of the take-up with the frame of the machine for this purpose. When the thread is broken or the tension released, the auxiliary take-up will move the contact 232 towards the vertical portions of the contact disks 226, but will not cause engagement therewith unless the main take-up is in its extreme thread retracting position, the auxiliary take-up engaging a stop (not shown) before the contacts are brought into engagement. The contact disks are held in a position out of engagement with the contact 232 by a spring 244 connected between an arm 246 extending from the sleeve 230 and the machine frame. The spring 244 acts to hold the arm 246 in engagement with a shoulder 248 on the frame and a portion of the arm extends into the path of movement of the main take-up 72 so that the main take-up will engage the arm 246 only in the maximum thread retracting position of the take-up. When the take-up engages the arm 246 the contact disks are moved into a position in which the contact 232 may engage them. As the take-up moves to release the thread the arm 246 again engages the shoulder 248 causing the arm to remain at rest during the remainder of the machine cycle. With this construction the movement of the take-up pivot 154 at the end of the seam does not interfere with the operation of the thread break indicating switch.

The nature and scope of the invention having been indicated and a specific embodiment illustrating the several features of the invention having been described, what is claimed is:

1. A lockstitch shoe sewing machine having, in combination, a hook needle, a rotary loop taker, a locking thread case, and means acting independently of the rotary movement of the loop taker for moving the thread case with relation to the loop taker to cause a predetermined amount of thread to be drawn from the thread mass in the case by reason of the resistance offered by the previously completed stitch in the work.

2. A lockstitch shoe sewing machine having, in combination, a hook needle, a rotary loop taker, a locking thread case arranged to be held stationary during a part of each stitching cycle, and means acting in another part of each cycle for moving the thread case relatively to the loop taker to increase by a predetermined amount an unsupported length of thread extending directly between the thread case and the previous stitch.

3. A lockstitch shoe sewing machine having, in combination, a hook needle, a rotary loop taker, a locking thread case mounted for rotation concentrically with the axis of the loop taker, and means acting during each cycle of the machine for rotating the thread case relatively to the loop taker to cause a predetermined amount of thread to be drawn from the thread mass in the case by reason of the resistance offered by the previously completed stitch in the work.

4. A lockstitch shoe sewing machine having, in combination, a work support, a presser foot, work piercing instruments including an awl and a hook needle, a rotary loop taker, a locking thread case mounted for rotation concentrically with the axis of the loop taker, means for imparting work piercing movements to said instruments and relative feeding movements to said instruments and the work support, and means acting subsequent to the completion of each stitch and before said relative feeding movement for rotating the thread case relative to the loop taker to cause a predetermined amount of thread to be drawn from the thread mass in the case by reason of the resistance offered by the previously completed stitch in the work.

5. A lockstitch sewing machine having, in combination, a hook needle, an awl, a rotary loop taker, a locking thread case mounted for rotation concentrically with the rotary axis of the loop taker, a take-up for drawing the needle loop from the thread case into the work and for setting the stitch, and means for rotating the thread case relative to the loop taker to draw off a measured amount of thread from the thread mass in the case after the stitch is set in each cycle of the machine, but before the tension exerted on the thread by the take-up is substantially released.

6. A lockstitch shoe sewing machine having, in combination with other stitch forming devices, a hook needle, a rotary loop taker, a locking thread case, means for moving the thread case during each stitch forming cycle to cause a predetermined amount of thread to be drawn from the thread mass in the case, and a thread lock to engage the locking thread against which the stitches are set.

7. A lockstitch shoe sewing machine having, in combination with other stitch forming devices, a hook needle, a rotary loop taker, a locking thread case, means for moving the thread case with relation to the loop taker during each stitch forming cycle to cause a predetermined amount of thread to be drawn from the thread mass in the case, a thread lock to engage the locking thread against which the stitches are set, and means for causing the thread lock to engage and release the locking thread during each stitch forming cycle.

8. A lockstitch sewing machine having, in combination with other stitch forming devices, a hook needle, a locking thread case, a rotary loop taker for passing a loop of needle thread about the thread case, means for rotating the thread case relatively to the loop taker during each cycle of the machine to draw off a measured amount of thread from the thread mass in the case, and a thread lock on the thread case arranged to release the thread during the thread drawing movement of the thread case.

9. A lockstitch sewing machine having, in combination with other stitch forming devices, a hook needle, a locking thread case, a rotary loop taker for passing a loop of needle thread about the thread case, means for rotating the thread case relatively to the loop taker during each cycle of the machine to draw off a measured amount of thread from the thread mass in the case, a thread lock on the thread case, and means operated by the loop taker to open the lock during the thread drawing movement of the thread case.

10. A lockstitch sewing machine having, in combination with other stitch forming devices, a hook needle, a locking thread case, a rotary loop taker for passing a loop of needle thread about the thread case, means for rotating the thread case relatively to the loop taker in one direction during each stitching cycle of the machine to draw off a measured amount of thread from the thread mass in the case and for returning the thread case to its original position to yield up thread as the stitch is being drawn into the work, and a thread lock on the thread case arranged to release the thread during movement of the thread case to draw off thread and to grip the thread after the thread yielding movement of the thread case.

11. A lockstitch sewing machine having, in combination with other stitch forming devices, a hook needle, a locking thread case, a rotary loop taker for passing a loop of thread about the thread case, alternately acting devices for engaging the thread case to secure it in proper angular position, and means for shifting the alternately acting devices to cause the thread case to move relatively to the loop taker and draw off thread from the thread mass in the case in an amount sufficient for the completion of each stitch.

12. A lockstitch sewing machine having, in combination with other stitch forming devices, a hook needle, a locking thread case, a rotary loop taker for passing a loop of needle thread about the thread case, a member mounted to rotate concentrically with the rotary axis of the loop taker, alternately acting pins slidable in said member for engaging recesses in the thread case to secure it in proper angular position, means for rotating said member to draw off a measured amount of thread from the thread mass in the case, and a thread lock on the thread case against which the stitches are set.

13. A lockstitch sewing machine having, in combination with other stitch forming devices, a hook needle, a locking thread case, a rotary loop taker for passing a loop of needle thread about the thread case, a member mounted to rotate concentrically with the rotary axis of the loop taker, pins slidable in said member for engaging recesses in the thread case to secure it in angular position, a cam portion on the loop taker for alternately retracting the pins to permit passage of the needle loop about the thread case, and means separate from the loop taker for rotating said member to draw off a measured amount of thread from the thread mass in the case.

14. A lockstitch sewing machine having, in combination with other stitch forming devices, a hook needle, a locking thread case, a rotary loop taker for passing a loop of needle thread about the thread case, a thread lock on the thread case arranged to be operated to grip and release the thread by the loop taker as it rotates, a member mounted to rotate concentrically with the axis of the loop taker, alternately acting pins slidable in said member for engaging recesses in the thread case to secure it against rotation with the loop taker, and means for rotating the said member while the lock is released to draw off a measured amount of thread from the thread mass in the case.

15. A lockstitch sewing machine having, in combination with other stitch forming devices, a hook needle, a locking thread case, a rotary loop taker for passing a loop of needle thread about the thread case to form a stitch, a take-up for drawing the needle loop from the thread case into the work and for setting the stitch, a lock engaging the locking thread against which the stitches are set, and means for causing the lock while gripping the thread to move a measured distance towards the work.

16. A lockstitch sewing machine having, in combination with other stitch forming devices, a needle, a locking thread case, a rotary loop taker for passing a loop of needle thread about the thread case to form a stitch, a take-up for drawing the needle loop from the thread case into the work and for setting the stitch, a lock engaging the locking thread against which the stitches are set, and means for causing the lock while gripping the thread to move towards the work during the thread drawing stroke of the take-up and for opening the lock to permit a supply of thread sufficient for the succeeding stitch to be drawn from the thread case.

17. A lockstitch sewing machine having, in combination with other stitch forming devices, a hook needle, a locking thread case, a rotary loop taker for passing a loop of needle thread about the thread case to form a stitch, a take-up for drawing the needle loop from the thread case into the work and for setting the stitch, and means acting before the take-up substantially releases the stitch setting strain on the thread to draw off and hold a measured amount of thread from the thread mass in the case and acting as the succeeding stitch is being set to yield the measured amount of thread.

18. A lockstitch sewing machine having, in combination, a hook needle, a locking thread case, a rotary loop taker for passing a loop of needle thread about the thread case to form a stitch, a thread lock lever pivotally mounted on the thread case and formed with cam surfaces on either side of the pivot, and means operated by the loop taker for alternately engaging the cam surfaces for opening the thread lock to release the thread and for closing the thread lock to grip the thread.

19. A lockstitch sewing machine having, in combination, work piercing instruments including a hook needle and an awl, a locking thread case, a rotary loop taker for passing a loop of needle thread about the thread case to form a stitch, a take-up for drawing the needle loop from the thread case into the work and for setting the stitch, and means acting to draw off and hold a measured supply of thread from the locking thread case after the stitch is set in each cycle of the machine and while one of said instruments engages the work and to yield the measured thread before the succeeding stitch is set.

20. A lockstitch sewing machine having, in combination, work piercing instruments including a hook needle and an awl, a locking thread case, a rotary loop taker for passing a loop of needle thread about the thread case to form a stitch, a take-up for drawing the needle loop from the thread case into the work and for setting the stitch, and means acting to draw off and hold a measured supply of thread from the locking thread case after the stitch is set in each cycle of the machine and while the needle engages the work, and to yield the measured supply of locking thread before the succeeding stitch is set.

21. A lockstitch sewing machine having, in combination, stitch forming devices, a needle, a rotary loop taker, a locking thread case, a thread lock member acting against the thread case to grip the thread, means for actuating the thread lock member towards and from engagement with the thread case, and thread guiding means having side openings for lateral passage of the thread in threading, arranged at either side of the point of locking engagement of thread lock member with the thread case for causing the thread extending between the thread guiding means to assume after threading the guiding means a position between the thread lock member and the thread case during the first movement of the lock member away from the thread case.

22. A lockstitch sewing machine having, in combination with other stitch forming devices, a needle, a rotary loop taker, a locking thread case, a thread lock lever on the thread case formed with a projection to grip the thread against the thread case and actuated by the loop taker to release the thread, thread guiding means in the thread case having a side opening for lateral passage of the thread in threading and a cork screw guide on the thread lock lever arranged in alinement with the point of engagement of the projection on the lock lever and the thread guiding means on the thread case for causing the thread to assume after threading the guiding means, a position between the thread lock lever and the thread case during the first movement of the projection on the lock lever to release the thread.

23. A lockstitch shoe sewing machine having, in combination with other stitch forming devices, an awl, a hook needle, a take-up, a locking thread case, a rotary loop taker for passing a loop of needle thread about the thread case, means for drawing off a predetermined amount of thread from the thread case against the resistance offered by the previously formed stitch in the work, and connections for actuating the needle and awl to cause one of said instruments to engage the work in each stitching cycle as the locking thread is being measured.

24. A lockstitch shoe sewing machine having, in combination with other stitch forming devices, a hook needle, a take-up, a locking thread case, a rotary loop taker for passing a loop of needle thread about the thread case, means for drawing off a predetermined amount of thread from the thread case against the resistance offered by the previously formed stitch in the work, and connections for actuating the needle to engage the work in each stitching cycle as the locking thread is being measured.

25. A lockstitch shoe sewing machine having, in combination with other stitch forming devices, a work support, a presser-foot, a needle, a take-up, a thread cutter arranged to sever the threads of the completed seam while the work is retained between the work support and the presser-foot, and means operating to hold the threads leading to the work against substantial movement while the thread cutter severs the threads.

OTTO R. HAAS.